US011560847B2

(12) United States Patent
Kelford et al.

(10) Patent No.: US 11,560,847 B2
(45) Date of Patent: Jan. 24, 2023

(54) TRANSPIRATIONALLY COOLED EXHAUST CENTER BODY FOR AN AIRCRAFT PROPULSION SYSTEM

(71) Applicant: Rohr, Inc., Chula Vista, CA (US)

(72) Inventors: Bryce T. Kelford, San Diego, CA (US); Adam Saunders, El Cajon, CA (US); Richard S. Alloway, San Diego, CA (US); Richard Haslim, Chula Vista, CA (US); Travis M. Frazier, Austin, TX (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 17/224,514

(22) Filed: Apr. 7, 2021

(65) Prior Publication Data
US 2021/0310411 A1     Oct. 7, 2021

Related U.S. Application Data

(60) Provisional application No. 63/006,410, filed on Apr. 7, 2020.

(51) Int. Cl.
| *F02C 7/141* | (2006.01) |
| *F02C 6/20*  | (2006.01) |
| *B64D 29/00* | (2006.01) |
| *B64D 33/08* | (2006.01) |

(52) U.S. Cl.
CPC .............. *F02C 7/141* (2013.01); *F02C 6/20* (2013.01); *B64D 29/00* (2013.01); *B64D 33/08* (2013.01); *F05D 2220/323* (2013.01)

(58) Field of Classification Search
CPC . F02C 7/141; F02C 6/20; B64D 29/00; B64D 33/08; F05D 2220/323
See application file for complete search history.

(56) References Cited

U.S. PATENT DOCUMENTS

| 3,721,389 | A | 3/1973 | MacKinnon | |
| 4,044,555 | A | 8/1977 | McLoughlin | |
| 4,645,032 | A * | 2/1987 | Ross | F02C 7/24 |
| | | | | 181/224 |
| 5,655,361 | A | 8/1997 | Kishi | |
| 6,584,766 | B1 * | 7/2003 | Czachor | F02K 1/82 |
| | | | | 60/264 |
| 6,640,537 | B2 | 11/2003 | Tse | |
| 6,845,607 | B2 | 1/2005 | Lair | |
| 9,200,537 | B2 | 12/2015 | Bouchard | |
| 9,725,183 | B2 | 8/2017 | Aten | |
| 9,761,216 | B2 * | 9/2017 | Nampy | G10K 11/172 |

(Continued)

FOREIGN PATENT DOCUMENTS

EP     3267023 B1     5/2020

OTHER PUBLICATIONS

EP search report for EP21167275.3 dated Sep. 2, 2021.

*Primary Examiner* — Shafiq Mian
(74) *Attorney, Agent, or Firm* — Getz Balich LLC

(57) ABSTRACT

An assembly is provided for an aircraft propulsion system. This assembly includes an exhaust center body and a duct system. The exhaust center body includes an exterior skin. The duct system is fluidly coupled with a plurality of exterior skin perforations in the exterior skin. The duct system is configured to direct bypass air received from a bypass flow path within the aircraft propulsion system to the exterior skin perforations.

18 Claims, 7 Drawing Sheets

(56) References Cited

U.S. PATENT DOCUMENTS

| | | | |
|---|---|---|---|
| 9,771,868 B2 * | 9/2017 | Nesbitt | F01D 25/24 |
| 9,869,186 B2 | 1/2018 | Xu | |
| 10,060,269 B2 | 8/2018 | Smith | |
| 2013/0142624 A1 * | 6/2013 | Julliard | G10K 11/175 |
| | | | 181/292 |
| 2016/0169005 A1 | 6/2016 | Quach | |
| 2016/0368615 A1 | 12/2016 | Alonso-Miralles | |
| 2017/0175539 A1 | 6/2017 | Hagan | |
| 2017/0211393 A1 | 7/2017 | Wong | |
| 2017/0301334 A1 * | 10/2017 | Nampy | G10K 11/172 |
| 2017/0328221 A1 | 11/2017 | Allen | |
| 2018/0051575 A1 | 2/2018 | Weber | |
| 2018/0066584 A1 | 3/2018 | Twelves | |

* cited by examiner

TRANSPIRATIONALLY COOLED EXHAUST CENTER BODY FOR AN AIRCRAFT PROPULSION SYSTEM This application claims priority to U.S. Patent Appln. No. 63/006,410 filed Apr. 7, 2020, which is hereby incorporated herein by reference in its entirety.

BACKGROUND

1. Technical Field

This disclosure relates generally to an aircraft propulsion system and, more particularly, to an exhaust center body.

2. Background Information

A modern aircraft propulsion system includes a gas turbine engine and a nacelle housing the gas turbine engine. As gas turbine engine designs are continually pushed for increased efficiency and/or increased thrust, gas temperatures within the gas turbine engine typically increase. These high gas temperatures may cause certain components of the aircraft propulsion system to prematurely degrade and require replacement. This is true particularly for components of the aircraft propulsion system, such as an exhaust center body, that are directly exposed to engine combustion products. There is a need in the art therefore for an improved exhaust center body which can accommodate increasing gas temperatures within a gas turbine engine.

SUMMARY OF THE DISCLOSURE

According to an aspect of the present disclosure, an assembly is provided for an aircraft propulsion system. This assembly includes an exhaust center body and a duct system. The exhaust center body includes an exterior skin. The duct system is fluidly coupled with a plurality of exterior skin perforations in the exterior skin. The duct system is configured to direct bypass air received from a bypass flow path within the aircraft propulsion system to the exterior skin perforations.

According to another aspect of the present disclosure, another assembly is provided for an aircraft propulsion system. This assembly includes an exhaust center body and a duct system. The exhaust center body includes an exterior skin and a porous layer of sound attenuating material located inward of and overlapped by the exterior skin. The duct system is configured to direct cooling air through the porous layer of sound attenuating material to a plurality of exterior skin perforations in the exterior skin for cooling the exhaust center body.

According to still another aspect of the present disclosure, still another assembly is provided for an aircraft propulsion system. This assembly includes an exhaust center body which includes a structural panel. The structural panel includes an exterior skin, an interior skin and a core arranged between and connected to the exterior skin and the interior skin. The exterior skin is configured as an exterior flow skin of the exhaust center body. One or more cavities within the core fluidly couple one or more interior skin perforations in the interior skin with one or more exterior skin perforations in the exterior skin.

The duct system may be configured to receive the cooling air from a bypass flow path within the aircraft propulsion system.

The exterior skin perforations may be configured to direct the bypass air received from duct system out of the exhaust center body to cool the exhaust center body.

The assembly may include outer nacelle structure and an inner nacelle structure. The inner nacelle structure may be at least partially covered by the outer nacelle structure. The bypass flow path may be at least partially formed by and radially between the outer nacelle structure and the inner nacelle structure.

The exterior skin may form an inner peripheral portion of a core flow path within the aircraft propulsion system.

The assembly may include a nozzle extending circumferentially around and radially spaced outward from the exhaust center body. The nozzle may form an outer peripheral portion of the core flow path.

The duct system may include a scoop that projects radially into the bypass flow path.

The duct system may extend radially across a core flow path within the aircraft propulsion system.

The exhaust center body may be configured with a single layer skin that may only include the exterior skin.

The exhaust center body may also include a porous layer of sound attenuating material. The duct system may be configured to direct the bypass air received from the bypass flow path through the porous layer of sound attenuating material to the exterior skin perforations.

The exhaust center body may include a structural panel. The structural panel may include the exterior skin, an interior skin and a core that is between and connected to the exterior skin and the interior skin. A plurality of cavities within the core may fluidly couple a plurality of interior skin perforations in the interior skin with the exterior skin perforations. The duct system may be fluidly coupled with the exterior skin perforations through the interior skin perforations and the cavities.

A quantity of the exterior skin perforations in the exterior skin may be equal to a quantity of the interior skin perforations in the interior skin.

A quantity of the exterior skin perforations in the exterior skin may be different than a quantity of the interior skin perforations in the interior skin.

A first of the exterior skin perforations may have a first size. A second of the interior skin perforations may have a second size. The first size may be equal to the second size.

A first of the exterior skin perforations may have a first size. A second of the interior skin perforations may have a second size. The first size may be different than the second size.

The structural panel may be configured such that one of the interior skin perforations feeds the bypass air to an array of the cavities.

The core may include a sidewall between and partially forming a first of the cavities and a second of the cavities. The sidewall may be configured with an aperture that fluidly couples the first of the cavities with the second of the cavities.

The exhaust center body may include a noise attenuating structural panel that includes the exterior skin.

The foregoing features and the operation of the invention will become more apparent in light of the following description and the accompanying drawings.

DETAILED DESCRIPTION

Figure 1:
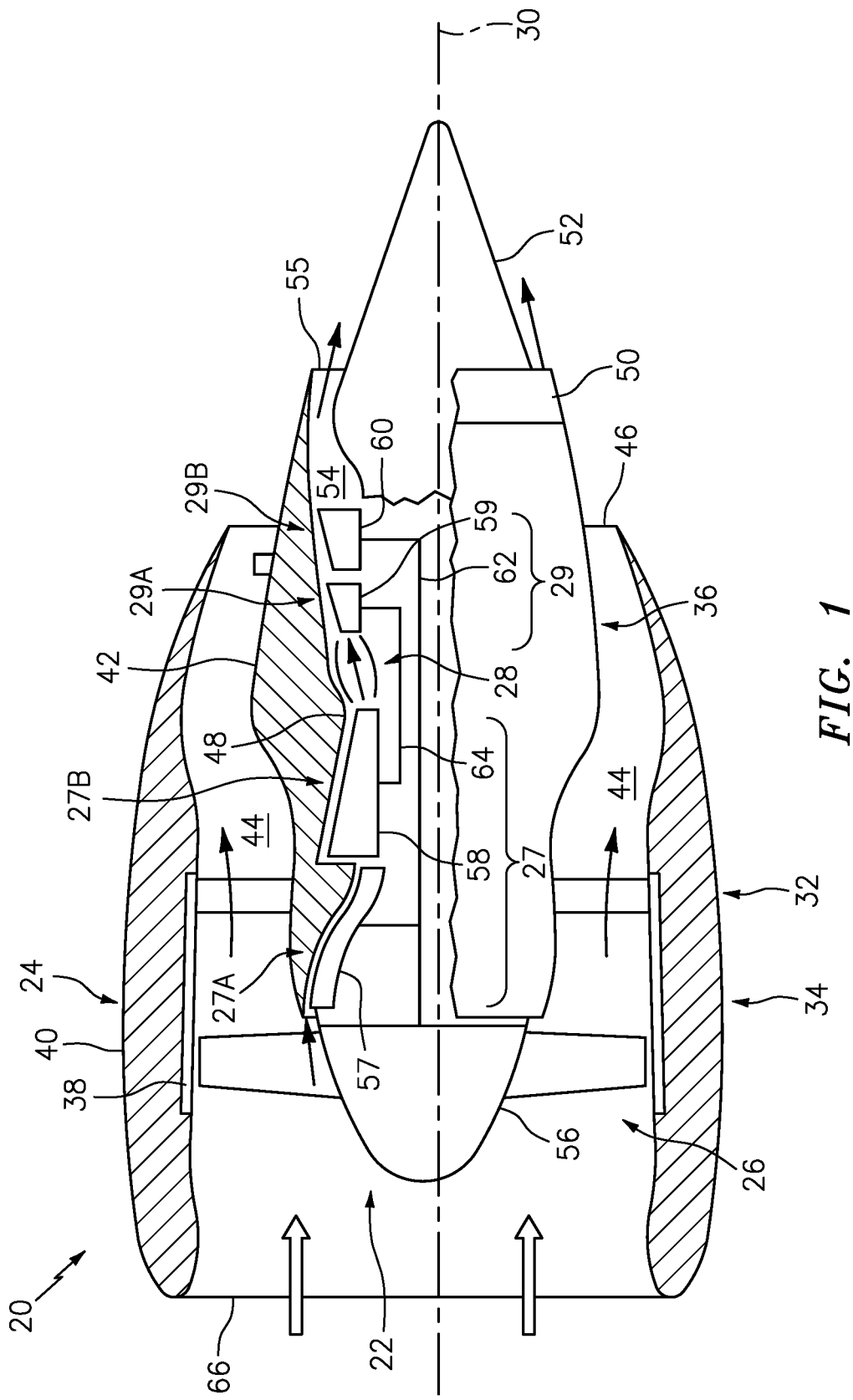
FIG. 1 is schematic side cutaway illustration of an aircraft propulsion system.

FIG. 1 illustrates an aircraft propulsion system 20 for an aircraft such as, but not limited to, a commercial airliner or cargo plane. The aircraft propulsion system 20 includes a gas turbine engine 22 and a nacelle 24.

The gas turbine engine 22 may be configured as a high-bypass turbofan engine. The gas turbine engine 22 of FIG. 1, for example, includes a fan section 26, a compressor section 27, a combustor section 28 and a turbine section 29. The compressor section 27 may include a low pressure compressor (LPC) section 27A and a high pressure compressor (HPC) section 27B. The turbine section 29 may include a high pressure turbine (HPT) section 29A and a low pressure turbine (LPT) section 29B.

The engine sections 26-29B are arranged sequentially along an axial centerline 30 (e.g., a rotational axis) of the gas turbine engine 22 within an aircraft propulsion system housing 32. This housing 32 includes an outer housing structure 34 and an inner housing structure 36.

The outer housing structure 34 includes an outer case 38 (e.g., a fan case) and an outer structure 40 of the nacelle 24; i.e., an outer nacelle structure. The outer case 38 houses at least the fan section 26. The outer nacelle structure 40 houses and provides an aerodynamic cover for the outer case 38. The outer nacelle structure 40 also covers a portion of an inner structure 42 of the nacelle 24; i.e., an inner nacelle structure, which may also be referred to as an inner fixed structure. More particularly, the outer nacelle structure 40 axially overlaps and extends circumferentially about (e.g., completely around) the inner nacelle structure 42. The outer nacelle structure 40 and the inner nacelle structure 42 thereby at least partially or completely form a bypass flow path 44. This bypass flow path 44 extends axially along the centerline 30 within the aircraft propulsion system 20 to a bypass nozzle outlet 46, where the bypass flow path 44 is radially between the nacelle structures 34 and 36.

The inner housing structure 36 includes an inner case 48 (e.g., a core case) and the inner nacelle structure 42. The inner case 48 houses one or more of the engine sections 27A-29B, which engine sections 27A-29B may be collectively referred to as an engine core. The inner nacelle structure 42 houses and provides an aerodynamic cover for the inner case 48. A downstream/aft portion of the inner housing structure 36 such as, for example, a core nozzle 50 of the inner nacelle structure 42 also covers at least a portion of an exhaust center body 52. More particularly, the inner nacelle structure 42 and its core nozzle 50 axially overlap and extend circumferentially about (e.g., completely around) the exhaust center body 52. The core nozzle 50 and the exhaust center body 52 thereby collectively form a downstream/aft portion of a core flow path 54. This core flow path 54 extends axially within the aircraft propulsion system 20, through the engine sections 27A-29B, to a core nozzle outlet 55 at a downstream/aft end of the aircraft propulsion system 20.

Each of the engine sections 26, 27A, 27B, 29A and 29B of FIG. 1 includes a respective rotor 56-60. Each of these rotors 56-60 includes a plurality of rotor blades arranged circumferentially around and connected to one or more respective rotor disks.

The fan rotor 56 and the LPC rotor 57 are connected to and driven by the LPT rotor 60 through a low speed shaft 62. The HPC rotor 58 is connected to and driven by the HPT rotor 59 through a high speed shaft 64. The shafts 62 and 64 are rotatably supported by a plurality of bearings (not shown). Each of these bearings is connected to the aircraft propulsion system housing 32 by at least one stationary structure such as, for example, an annular support strut.

During operation, air enters the aircraft propulsion system 20 through an airflow inlet 66. This air is directed through the fan section 26 and into the core flow path 54 and the bypass flow path 44. The air within the core flow path 54 may be referred to as "core air". The air within the bypass flow path 44 may be referred to as "bypass air".

The core air is compressed by the compressor rotors 57 and 58 and directed into a combustion chamber of a combustor in the combustor section 28. Fuel is injected into the combustion chamber and mixed with the compressed core air to provide a fuel-air mixture. This fuel air mixture is ignited and combustion products thereof flow through and sequentially cause the turbine rotors 59 and 60 to rotate. The rotation of the turbine rotors 59 and 60 respectively drive rotation of the compressor rotors 58 and 57 and, thus, compression of the air received from a core airflow inlet. The rotation of the turbine rotor 60 also drives rotation of the fan rotor 56, which propels bypass air through and out of the bypass flow path 44. The propulsion of the bypass air may account for a majority of thrust generated by the turbine engine 22, e.g., more than seventy-five percent (75%) of engine thrust. The aircraft propulsion system 20 of the present disclosure, however, is not limited to the foregoing exemplary thrust ratio. Furthermore, the aircraft propulsion system 20 of the present disclosure is not limited to the exemplary gas turbine engine configuration described above.

The combustion products flowing through the core flow path 54 and out of the aircraft propulsion system 20 can subject various propulsion system components to severe operating conditions. Components that form and/or are proximate the core flow path 54, for example, may routinely be subjected to relatively high operating temperatures, relatively high thermally induced stresses and/or relatively large temperature gradients particularly, for example, during engine startup and/or aircraft takeoff. Such operating conditions may become even more severe as aircraft propulsion system engineers continue to push design limits to further increase engine efficiency and/or engine thrust.

The components that form and/or are proximate the core flow path 54 may be configured to accommodate the severe operating conditions through material selection and/or by providing cooling. The exhaust center body 52, for example, may be manufactured from heat resistant material(s) such as, but not limited to, ceramic material (e.g., pure ceramic material, ceramic matrix composite (CMC) material), metal (e.g., metal matric composite (MMC) material, metal super alloy) and/or non-metal and/or non-ceramic material (e.g., polymer, polymer matrix composite (PMC) material). The exhaust center body 52 may also or alternatively be configured with any one or more of the cooling schemes described below.

Figure 2:
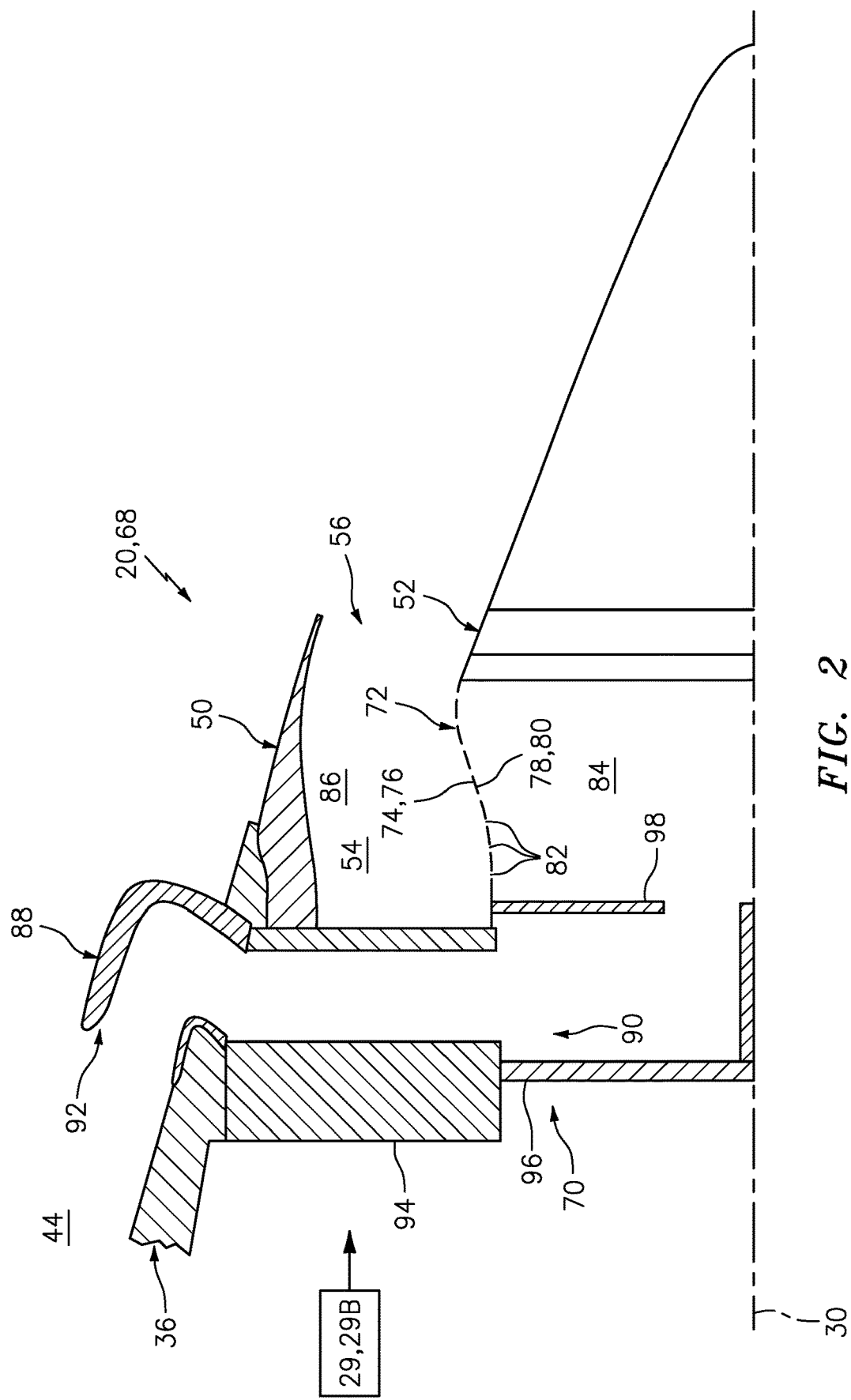
FIG. 2 is a partial side sectional schematic illustration of an assembly for the aircraft propulsion system.

FIG. 2 illustrates a portion of an assembly 68 for the aircraft propulsion system 20. This aircraft propulsion system assembly 68 includes the outer housing structure 34 (see FIG. 1), the inner housing structure 36 and the exhaust center body 52. The aircraft propulsion system assembly 68 of FIG. 1 also includes a cooling air source and a duct system 70 configured for facilitating (e.g., transpirational) cooling of the exhaust center body 52.

At least a portion (or an entirety) of the exhaust center body 52 of FIG. 2 is configured with/has a single layer skin consisting of (e.g., only including) an exterior skin 72. A sidewall of the exhaust center body 52 of FIG. 2, for example, may have a single layer thickness such that the exhaust center body 52 extends radially between an outer surface 74 of the exterior skin 72 (here, also an exterior/outer surface 76 of the exhaust center body 52) and an inner surface 78 of the exterior skin 72 (here, also an interior/inner surface 80 of the exhaust center body 52).

The exterior skin 72 is configured as a tubular (or arcuate) body. The exterior skin 72 of FIG. 2, for example, extends axially along and circumferentially about (e.g., completely around) the centerline 30. The exterior skin 72 is also configured as a perforated skin. More particularly, a plurality of exterior skin perforations 82 (e.g., through holes) extend (e.g., generally radially) through the exterior skin 72 between the outer surface 74/the exterior surface 76 and the inner surface 78/the interior surface 80. The exterior skin perforations 82 thereby pierce the exterior skin 72 and fluidly couple an interior space 84 (e.g., cavity, plenum, etc.) inside of the exhaust center body 52 with an exterior space 86 (e.g., the core flow path 54) outside of the exhaust center body 52.

The cooling air source is configured to provide relatively cool air at, for example, a relatively low pressure. The cooling air source of FIG. 2, for example, is the bypass flow path 44. Typically, bypass air has a lower temperature and a lower pressure than air bleed from the compressor section 27. The lower temperature of the bypass air may facilitate improved cooling of the exhaust center body 52. The lower pressure of the bypass air may also reduce pressure related stresses and/or structural design requirements for the exhaust center body 52.

The duct system 70 of FIG. 2 is fluidly coupled with and between the exterior skin perforations 82 and the cooling air source. This duct system 70 is configured to direct the cooling air (e.g., bypass air) from the cooling air source (e.g., the bypass flow path 44) to the exterior skin perforations 82. The exterior skin perforations 82 subsequently direct (e.g., effuse) the received cooling air out of the exhaust center body 52 to transpirationally cool the exhaust center body 52. The cooling air expelled from the exterior skin perforations 82 into the core flow path 54 may also form a film against the exterior surface 76 of the exhaust center body 52 and thereby further film cool the exterior surface 76. By cooling the exhaust center body 52, the exhaust center body 52 may accommodate the severe operating conditions imposed by the combustion products flowing through and out of the core flow path 54.

The duct system 70 of FIG. 2 includes a scoop 88 and a flow passage 90. The scoop 88 is configured to receive bypass air from the bypass flow path 44. The scoop 88 of FIG. 2, for example, has a cup shaped body that projects (e.g., radially) out from the inner nacelle structure 42 and partially into the bypass flow path 44. An open end 92/inlet of the scoop 88 is positioned to face in an upstream/forward direction such that the scoop 88 may bleed/funnel a portion of the bypass air into the flow passage 90. Various other types and configurations of scoops/bleed inlets are also known in the art, and the present disclosure is not limited to any particular ones thereof.

The flow passage 90 may include and/or be formed by one or more conduits (e.g., pipe, hose, tube, etc.) and/or any other structure or structures that partially or completely form an internal void (e.g., a cavity, channel, etc.) through which the cooling air may flow. The flow passage 90 of FIG. 2, for example, is collectively formed by a hollow vane 94, a conduit 96, a bulkhead 98 and the exhaust center body 52.

The flow passage 90 is fluidly coupled with and extends between the scoop 88 and the exterior skin perforations 82. In order to cross the core flow path 54, a (e.g., upstream) portion of the flow passage 90 may be defined by an interior bore which extends radially through the hollow vane 94. This hollow vane 94 may be configured as part of a turbine exhaust case (TEC) structure arranged axially between the turbine section 29 (e.g., the LPT section 29B) and the exhaust center body 52. The present disclosure, however, is not limited to any particular structure for routing the cooling air across the core flow path 54.

Figure 3:
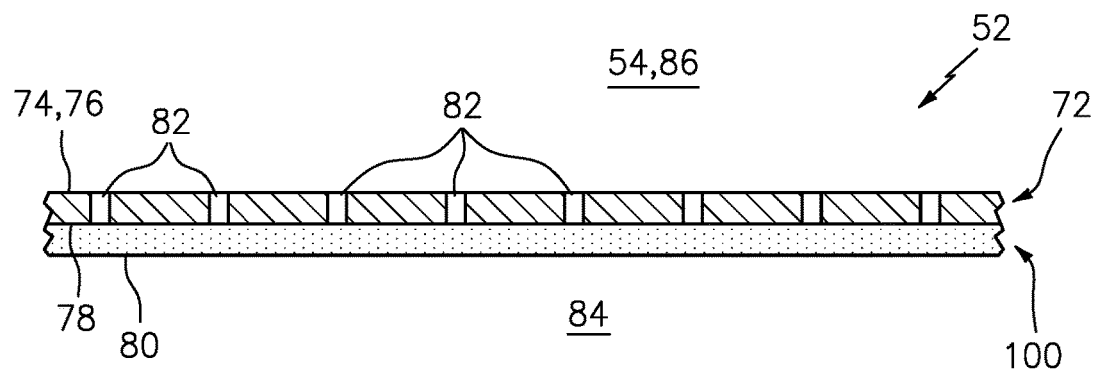
FIG. 3 is a side sectional illustration of a portion of an exhaust center body sidewall.

In some embodiments, referring to FIG. 3, the exhaust center body 52 may also include a porous layer of sound attenuating material 100; e.g., porous ceramic felt. The porous layer of sound attenuating material 100 of FIG. 3 is abutted against the inner surface 78 of the exterior skin 72 and/or attached (e.g., bonded) to the exterior skin 72. The porous layer of sound attenuating material 100 overlaps/covers at least some or all of the exterior skin perforations 82. With this configuration, the exterior skin perforations 82 receive the cooling air from the duct system 70 (see FIG. 2) through pores in the porous layer of sound attenuating material 100. However, while the cooling air may still flow to the exterior skin perforations 82 for cooling the exhaust center body 52, the porous layer of sound attenuating material 100 may attenuate/absorb sound waves that enter the exhaust center body 52 through the exterior skin perforations 82 from the core flow path 54. The porous layer of sound attenuating material 100 may thereby configure the exhaust center body 52 for (e.g., broadband) noise attenuation.

Figure 4:
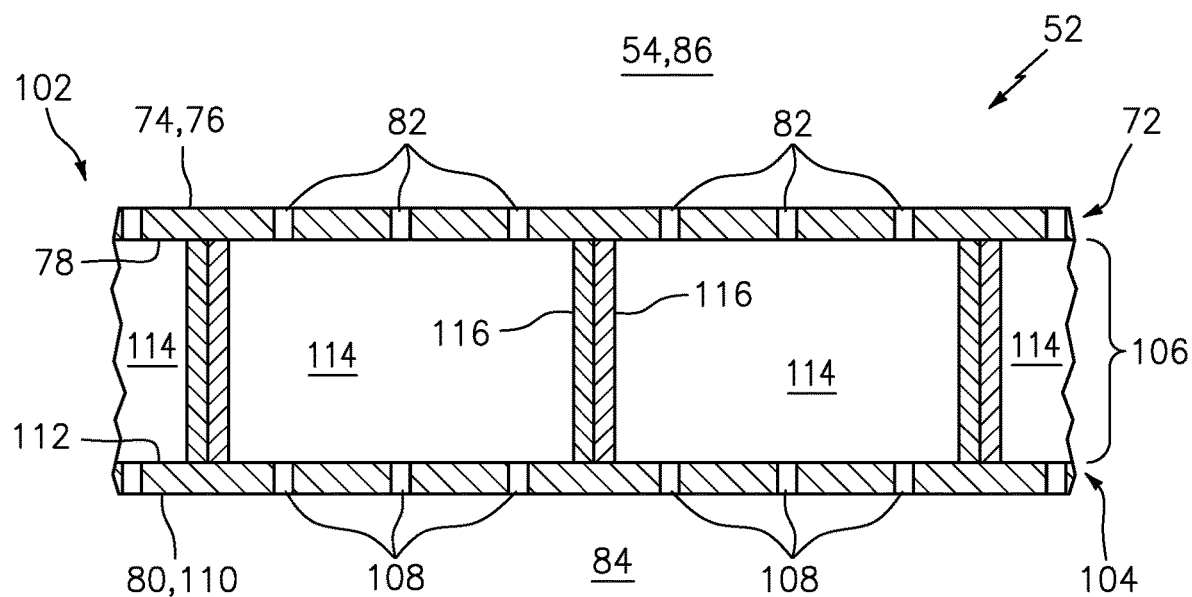
FIG. 4 is a side sectional illustration of a portion of another exhaust center body sidewall.

In some embodiments, referring to FIG. 4, the exhaust center body 52 may include at least one (e.g., tubular, conical or arcuate) structural panel 102, or an array of panels 102. The structural panel 102 of FIG. 4 includes the exterior skin 72, an interior skin 104 and a cellular core 106.

The exterior skin 72 may generally have the same configuration as described above.

The interior skin 104 may be configured as a tubular (or arcuate) body. The interior skin 104 of FIG. 4, for example, extends axially along and circumferentially about (e.g., completely around) the centerline 30. The interior skin 104 is also configured as a perforated skin. More particularly, a plurality of interior skin perforations 108 (e.g., through holes) extend (e.g., generally radially) through the interior skin 104 between an inner surface 110 of the interior skin 104 (here, also the interior surface 80 of the exhaust center body 52) and an outer surface 112 of the interior skin 104. The interior skin perforations 108 thereby pierce the interior skin 104 and fluidly couple the interior space 84 inside of the exhaust center body 52 with one or more cavities 114 within the cellular core 106 between the interior skin 104 and the exterior skin 72.

Figure 5:
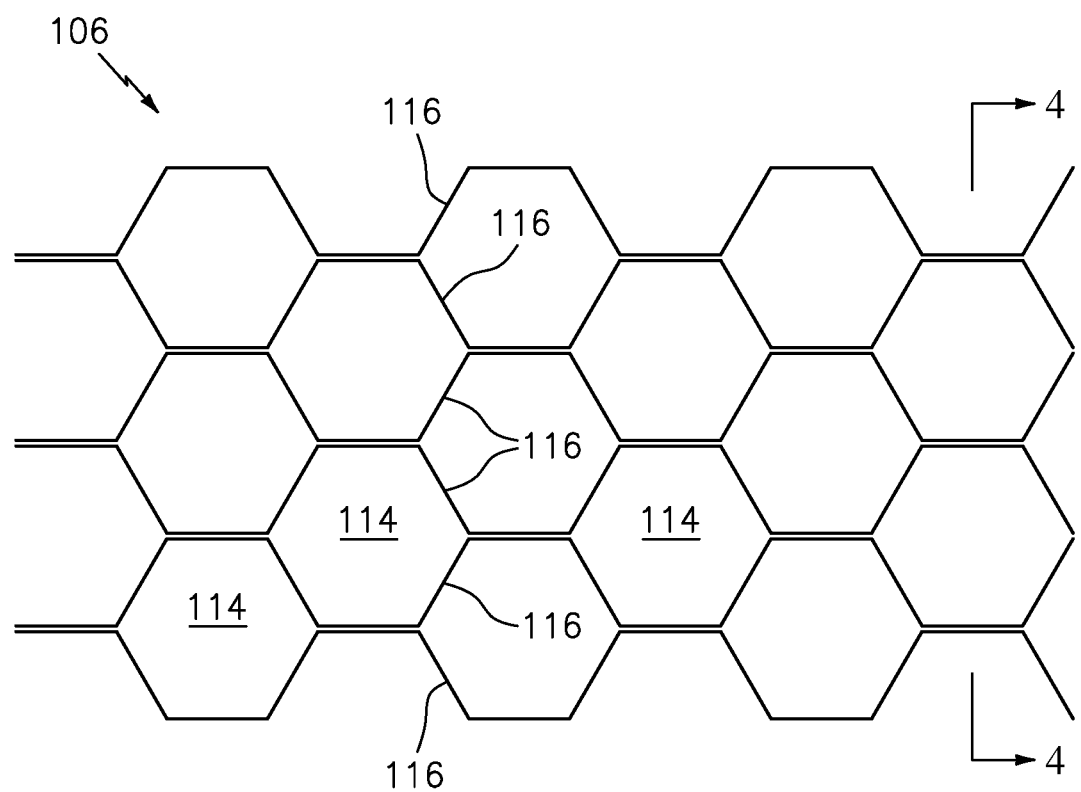
FIG. 5 is an illustration of an exhaust center body sidewall core.

The cellular core 106 is configured to form the one or more cavities 114 with the exterior skin 72 and the interior skin 104. The cellular core 106 of FIG. 5, for example, is configured as a honeycomb core. This cellular core 106 includes a plurality of corrugated sidewalls 116. The sidewalls 116 are arranged in a side-by-side array and connected to one another such that each adjacent (neighboring) pair of sidewalls 116 forms an array of the cavities 114 therebetween. Referring to FIG. 4, each of the cavities 114 extends (e.g., generally radially) through the cellular core 106 to and between the exterior skin 72 and the interior skin 104. Each cavity 114 may thereby be fluidly coupled with one or more of the exterior skin perforations 82 in the exterior skin 72 and one or more of the interior skin perforations 108 in the interior skin 104. Referring again to FIG. 5, each cavity 114 may have a polygonal (e.g., hexagonal) cross-sectional geometry when viewed in a plane parallel to one or more of the elements 72, 104 (see FIG. 4). The present disclosure, however, is not limited to any particular cellular core configurations.

During operation, the interior skin perforations 108 of FIG. 4 receive the cooling air from the duct system 70 (see FIG. 2) and direct this received cooling air into the cavities 114 in the cellular core 106. The exterior skin perforations 82 subsequently receive the cooling air from within the cavities 114 and direct this received cooling air into the core flow path 54. The cooling air thereby flows through and transpirationally cools the structural panel 102. The structural panel 102 itself may further provide increased structural rigidity to the exhaust center body 52 as compared to, for example, a single sheet of thin material forming an exhaust center body. In addition or alternatively, the structural panel 102 may decrease the weight of the exhaust center body 52 as compared to, for example, a single sheet of thick/stiff material forming an exhaust center body.

Figure 6A:
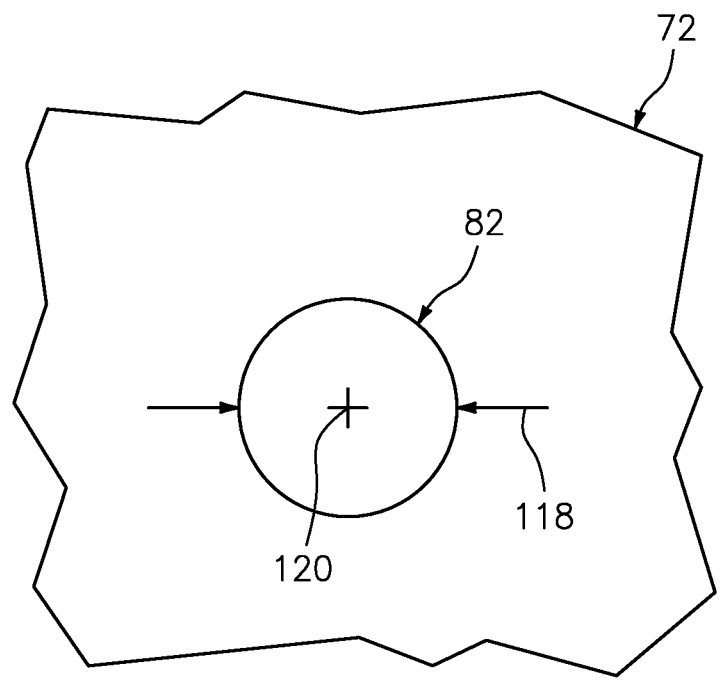
FIG. 6A is an illustration of a portion of an exhaust center body sidewall exterior skin with a perforation.
Figure 6B:
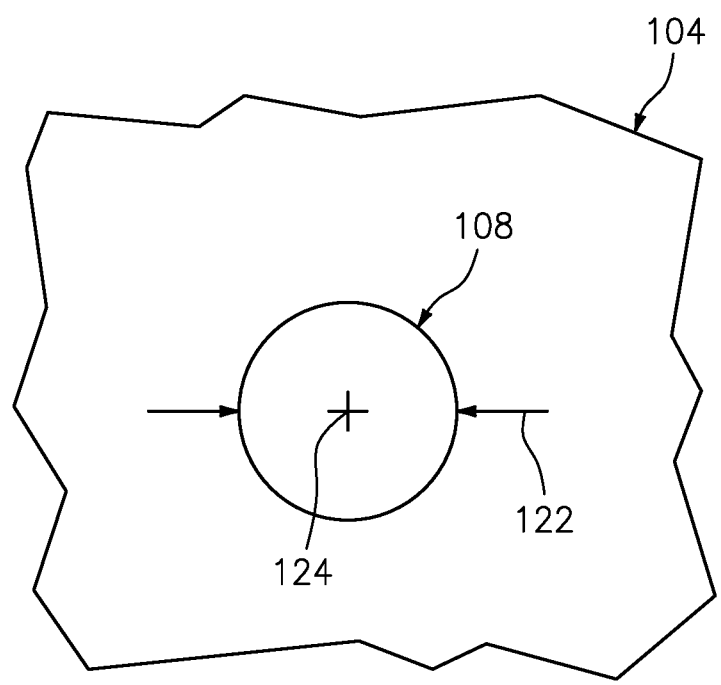
FIG. 6B is an illustration of a portion of an exhaust center body sidewall interior skin with a perforation.

Referring to FIG. 6A, each exterior skin perforation 82 has an exterior perforation configuration. Each exterior skin perforations 82, more particularly, has an exterior perforation shape and an exterior perforation size 118 (e.g., width, diameter) when viewed in a plane, for example, perpendicular to a centerline axis 120 of that perforation 82; e.g., plane of FIG. 6A. Referring to FIG. 6B, each interior skin perforation 108 has an interior perforation configuration. Each interior skin perforation 108, more particularly, has an interior perforation shape and an interior perforation size 122 (e.g., width, diameter) when viewed in a plane, for example, perpendicular to a centerline axis 124 of that perforation 108; e.g., plane of FIG. 6B. In some embodiments, the interior perforation configuration may be the same as the exterior perforation configuration. In other embodiments, the interior perforation configuration may be different than the exterior perforation configuration. For example, the interior perforation size 122 of one or more or each interior skin perforation 108 may be different (e.g., smaller or greater) than the exterior perforation size 118 of one or more or each exterior skin perforation 82. In addition or alternatively, the interior perforation shape of one or more or each interior skin perforation 108 may be different than the exterior perforation shape of one or more of each exterior skin perforation 82.

A first quantity of the exterior skin perforations 82 is configured in the exterior skin 72. A second quantity of the interior skin perforations 108 is configured in the interior skin 104. The second quantity may be equal to the first quantity as shown, for example, in FIG. 4. Alternatively, the second quantity may be greater than the first quantity as shown, for example, in FIG. 7. Still alternatively, the second quantity may be less than the first quantity as shown, for example, in FIG. 8.

Figure 7:
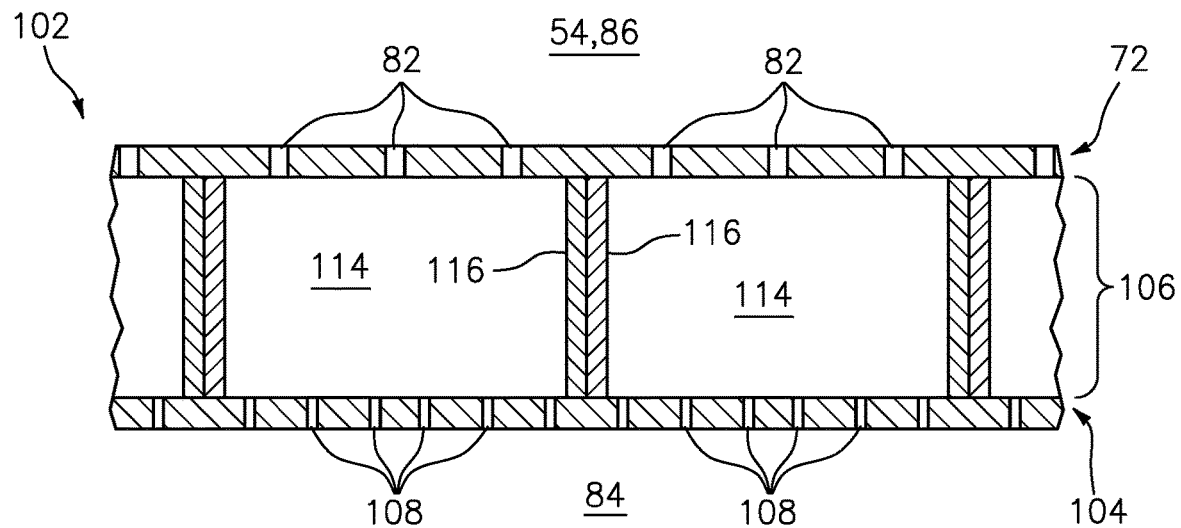
FIG. 7 is a side sectional illustration of a portion of another exhaust center body sidewall.

Referring to FIG. 7, by configuring the interior skin 104 with smaller (or fewer) perforations than the exterior skin 72, the structural panel 102 may be configured as a sound (e.g., noise) attenuating structural panel. For example, each cavity 114 may be configured as a Helmholtz resonator that attenuates sound waves (e.g., noise) that enter the cavity 114 through the respective exterior skin perforation(s) 82. Since the interior skin perforations 108 are smaller than the exterior skin perforations 82, it is believed that only a portion of the sound waves will pass through the interior skin 104 while the remaining sound waves will be reflected by the interior skin 104 and thereby provide attenuation.

Figure 8:
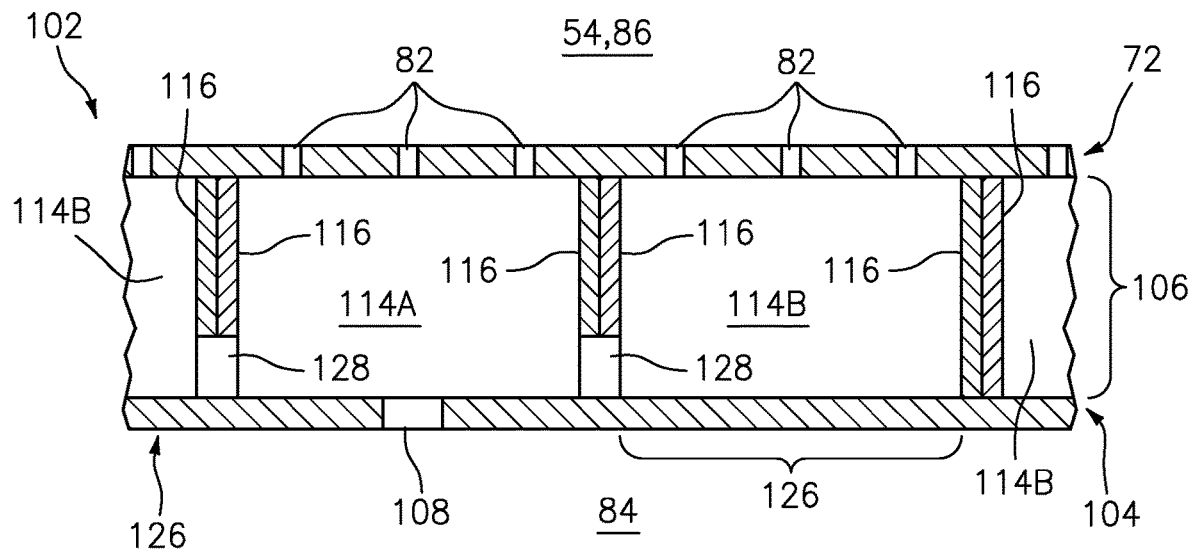
FIG. 8 is a side sectional illustration of a portion of another exhaust center body sidewall.

Referring to FIG. 8, the cavities 114 may be arranged into a first set of cavities 114A and a second set of cavities 114B. Each cavity 114A in the first set may be aligned with at least one of the interior skin perforations 108 and one or more of the exterior skin perforations 82. Each cavity 114B in the second set may only be aligned with one or more of the exterior skin perforations 82 such that, for example, a portion 126 of the interior skin 104 overlapping that cavity 114B is non-perforated. These second set cavities 114B may thereby be configured as Helmholtz resonators for attenuating sound waves (e.g., noise) that enters the cavities 114B through the respective exterior skin perforation(s) 82. However, the second set cavities 114B may also be configured to flowing the cooling air. In particular, a sidewall 116 between each second set cavity 114B and a neighboring first set cavity 114A may include an aperture 128 (e.g., a slot, through-hole, etc.) that fluidly couples those cavities 114 together. Each second set cavity 114B may thereby receive the cooling air from a respective one of the first set cavities 114. Thus, a single one (or an array/cluster) of the interior skin perforations 108 may feed cooling air to a plurality of the cavities 114A and 114B.

Figure 9:
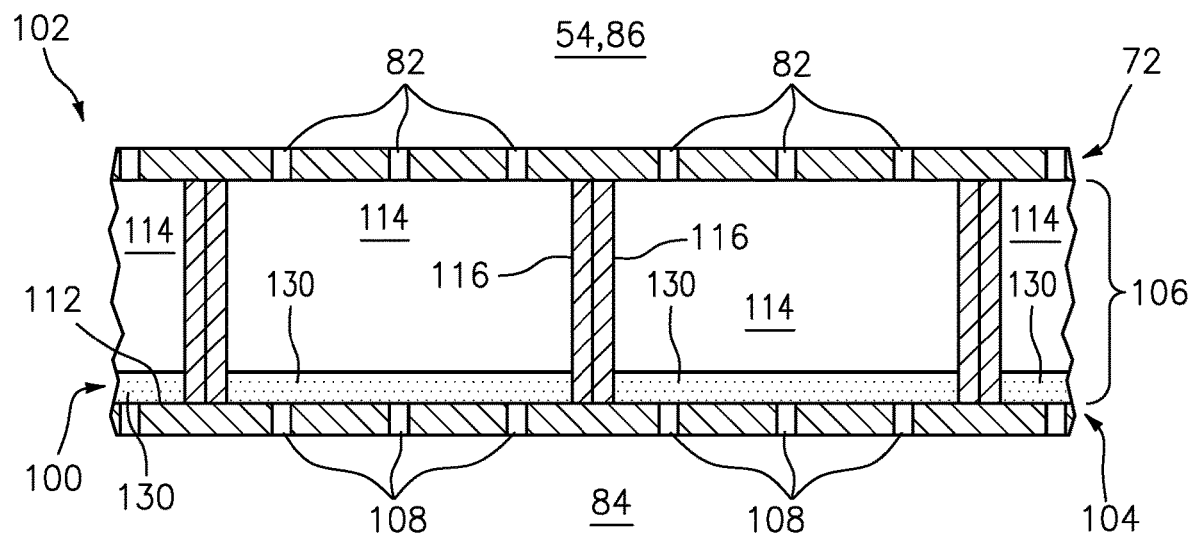
FIG. 9 is a side sectional illustration of a portion of still another exhaust center body sidewall.

Referring to FIG. 9, the structural panel 102 may be configured with the porous layer of sound attenuating material 100. This porous layer of sound attenuating material 100 may be abutted against the outer surface 112 of the interior skin 104. For example, the porous layer of sound attenuating material 100 may be configured into a plurality of inserts 130. Each insert 130 is disposed within a respective cavity 114. Each insert 130 may be attached (e.g., bonded) to the interior skin 104 and/or the cellular core 106. Each insert 130 overlaps/covers at least some or all of the interior skin perforations 108 aligned with the respective cavity 114. With this configuration, the porous layer of sound attenuating material 100 may attenuate/absorb sound waves that enter the exhaust center body 52 through the exterior skin perforations 82 from the core flow path 54.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
    an outer nacelle structure;
    an inner nacelle structure at least partially covered by the outer nacelle structure;
    an exhaust center body comprising an exterior skin, the exterior skin forming an inner peripheral portion of a core flow path within the aircraft propulsion system;
    a nozzle extending circumferentially around and radially spaced outward from the exhaust center body, the nozzle forming an outer peripheral portion of the core flow path; and
    a duct system fluidly coupled with a plurality of exterior skin perforations in the exterior skin, the duct system configured to direct bypass air received from a bypass flow path within the aircraft propulsion system to the plurality of exterior skin perforations, and the bypass flow path at least partially formed by and radially between the outer nacelle structure and the inner nacelle structure.

2. The assembly of claim 1, wherein the plurality of exterior skin perforations are configured to direct the bypass air received from duct system out of the exhaust center body to cool the exhaust center body.

3. The assembly of claim 1, wherein the duct system comprises a scoop that projects radially into the bypass flow path.

4. The assembly of claim 1, wherein the duct system extends radially across the core flow path.

5. The assembly of claim 1, wherein the exhaust center body is configured with a single layer skin that consists of the exterior skin.

6. The assembly of claim 1, wherein
    the exhaust center body further includes a porous layer of sound attenuating material; and
    the duct system is configured to direct the bypass air received from the bypass flow path through the porous layer of sound attenuating material to the plurality of exterior skin perforations.

7. The assembly of claim 1, wherein
    the exhaust center body comprises a structural panel;
    the structural panel includes the exterior skin, an interior skin and a core that is between and connected to the exterior skin and the interior skin;
    a plurality of cavities within the core fluidly couple a plurality of interior skin perforations in the interior skin with the plurality of exterior skin perforations; and
    the duct system is fluidly coupled with the plurality of exterior skin perforations through the plurality of interior skin perforations and the plurality of cavities.

8. The assembly of claim 7, wherein a quantity of the plurality of exterior skin perforations in the exterior skin is equal to a quantity of the plurality of interior skin perforations in the interior skin.

9. The assembly of claim 7, wherein a quantity of the plurality of exterior skin perforations in the exterior skin is different than a quantity of the plurality of interior skin perforations in the interior skin.

10. The assembly of claim 7, wherein
    a first of the plurality of the exterior skin perforations has a first size;
    a second of the plurality of the interior skin perforations has a second size; and
    the first size is equal to the second size.

11. The assembly of claim 7, wherein
    a first of the plurality of the exterior skin perforations has a first size;
    a second of the plurality of the interior skin perforations has a second size; and
    the first size is different than the second size.

12. The assembly of claim 7, wherein the structural panel is configured such that one of the interior skin perforations feeds the bypass air to an array of the plurality of cavities.

13. The assembly of claim 7, wherein
    the core includes a sidewall between and partially forming a first of the plurality of cavities and a second of the plurality of cavities; and
    the sidewall is configured with an aperture that fluidly couples the first of the plurality of cavities with the second of the plurality of cavities.

14. The assembly of claim 1, wherein the exhaust center body comprises a noise attenuating structural panel that includes the exterior skin.

15. An assembly for an aircraft propulsion system, comprising:
    a compressor section, a combustor section, a turbine section and a core flow path extending sequentially through the compressor section, the combustor section and the turbine section;
    an exhaust center body including an exterior skin and a porous layer of sound attenuating material located inward of and overlapped by the exterior skin, the exterior skin forming an inner peripheral portion of the core flow path; and
    a duct system configured to direct cooling air through the porous layer of sound attenuating material to a plurality of exterior skin perforations in the exterior skin for cooling the exhaust center body.

16. The assembly of claim 15, wherein the duct system is configured to receive the cooling air from a bypass flow path within the aircraft propulsion system.

17. An assembly for an aircraft propulsion system, comprising:
    an exhaust center body comprising a structural panel;
    the structural panel including an exterior skin, an interior skin and a core arranged between and connected to the exterior skin and the interior skin; and
    the exterior skin configured as an exterior flow skin of the exhaust center body, and the exterior flow skin configured to form an inner peripheral portion of a core flow path which extends through a compressor section, a combustor section and a turbine section of the aircraft propulsion system;
    wherein one or more cavities within the core fluidly couple one or more interior skin perforations in the interior skin with one or more exterior skin perforations in the exterior skin.

18. The assembly of claim 15, wherein the porous layer of sound attenuating material comprises ceramic felt.

* * * * *